(12) United States Patent
Bennett

(10) Patent No.: US 11,334,873 B2
(45) Date of Patent: May 17, 2022

(54) PROXY CARD PROVIDING INDIRECT FUNDS ACCESS

(71) Applicant: ENPULZ, LLC, Austin, TX (US)

(72) Inventor: James D. Bennett, Hroznetin (CZ)

(73) Assignee: ENPULZ, LLC, Austin, TX (US)

( * ) Notice: Subject to any disclaimer, the term of this patent is extended or adjusted under 35 U.S.C. 154(b) by 74 days.

(21) Appl. No.: 17/013,728

(22) Filed: Sep. 7, 2020

(65) Prior Publication Data

US 2020/0402043 A1 Dec. 24, 2020

Related U.S. Application Data

(63) Continuation of application No. 16/403,666, filed on May 6, 2019, now Pat. No. 10,769,619, which is a continuation of application No. 14/282,181, filed on May 20, 2014, now Pat. No. 10,311,430, which is a continuation of application No. 13/664,136, filed on Oct. 30, 2012, now Pat. No. 8,732,085, which is a
(Continued)

(51) Int. Cl.
| | |
|---|---|
| G06Q 20/30 | (2012.01) |
| G06Q 20/34 | (2012.01) |
| G06Q 20/10 | (2012.01) |
| G06Q 20/20 | (2012.01) |
| G06Q 30/06 | (2012.01) |
| G06Q 40/02 | (2012.01) |

(52) U.S. Cl.
CPC ....... *G06Q 20/3572* (2013.01); *G06Q 20/105* (2013.01); *G06Q 20/20* (2013.01); *G06Q 30/06* (2013.01); *G06Q 40/02* (2013.01)

(58) Field of Classification Search
USPC ..................................... 705/35, 41
See application file for complete search history.

(56) References Cited

U.S. PATENT DOCUMENTS

| | | | | |
|---|---|---|---|---|
| 4,843,220 A | * | 6/1989 | Haun ............... | G06K 17/00 235/380 |
| 5,590,038 A | | 12/1996 | Pitroda | |

(Continued)

FOREIGN PATENT DOCUMENTS

NL 9200876 A 12/1993

OTHER PUBLICATIONS

IDTek ID Technology (tmJ is scheduled for first production late in 1999. The description below captures the basis of the technology which may be produced informs as small as a standard debit or credit card; 1999; 2 pgs.
(Continued)

*Primary Examiner* — William E Rankins
(74) *Attorney, Agent, or Firm* — Garlick & Markison; Bruce Garlick

(57) ABSTRACT

A proxy card used at an ATM, or at any vendor store, that has a legacy point of sale unit or at a store with the smart point of sale. In general, it can be used with any vendor and otherwise as any credit or debit card might be used. The point-of sale unit interacts with a multi-source processing system (MSPS) that, instead of servicing a single money source, interacts with more than one of a plurality of monetary sources that may be associated with the proxy card. The money transferred from credit or debit accounts of the user may be either transferred directly or indirectly via a proxy central account associated with the MSPS that a user maintains.

6 Claims, 7 Drawing Sheets

Related U.S. Application Data continuation of application No. 11/834,294, filed on Aug. 6, 2007, now Pat. No. 8,326,758.

(56) References Cited

U.S. PATENT DOCUMENTS

| | | | |
|---|---|---|---|
| 5,915,023 A | 6/1999 | Bernstein | |
| 6,016,476 A | 1/2000 | Maes | |
| 6,427,911 B1 | 8/2002 | Barnes et al. | |
| 6,715,679 B1* | 4/2004 | Infosino | G07F 7/0886 235/449 |
| 6,805,287 B2 | 10/2004 | Bishop | |
| 7,099,850 B1 | 8/2006 | Mann, II | |
| 7,499,889 B2 | 3/2009 | Golan et al. | |
| 7,562,818 B1 | 7/2009 | Bierbaum | |
| 7,725,387 B1 | 5/2010 | Fitch et al. | |
| 9,092,767 B1 | 7/2015 | Andrews | |
| 2003/0061157 A1 | 3/2003 | Hirka | |
| 2003/0097331 A1 | 5/2003 | Cohen | |
| 2003/0126094 A1 | 7/2003 | Fisher | |
| 2003/0144956 A1 | 7/2003 | Yu | |
| 2004/0010462 A1 | 1/2004 | Moon | |
| 2004/0049452 A1 | 3/2004 | Blagg | |
| 2005/0086160 A1 | 4/2005 | Wong | |
| 2005/0273431 A1 | 12/2005 | Abel | |
| 2006/0036538 A1 | 2/2006 | Griffis et al. | |
| 2006/0212393 A1 | 9/2006 | Lindsay Brown | |
| 2007/0192245 A1 | 8/2007 | Fisher | |
| 2007/0228157 A1 | 10/2007 | Eckert | |
| 2008/0015988 A1 | 1/2008 | Brown | |
| 2011/0047074 A1 | 2/2011 | Cai | |

OTHER PUBLICATIONS

Svigals; Technology adds functionality to ID cards; /—: Get ready to replace that bulging purse or wallet-full of cards with a single, multi; 1999; 5 pgs.

* cited by examiner

PROXY CARD PROVIDING INDIRECT FUNDS ACCESS

CROSS REFERENCE TO PRIORITY APPLICATIONS

The present U.S. Utility Patent Application claims priority pursuant to 35 U.S.C. § 120 as a continuation of U.S. application Ser. No. 16/403,666, entitled "Proxy Card Providing Indirect Funds Access" filed May 6, 2019, which is a continuation of U.S. application Ser. No. 14/282,181, entitled "Proxy Card Providing Indirect Funds Access" filed May 20, 2014, now U.S. Pat. No. 10,311,430, which is a continuation of U.S. application Ser. No. 13/664,136, entitled "Proxy Card Providing Indirect Funds Access" filed Oct. 30, 2012, now U.S. Pat. No. 8,732,085, which is a continuation of U.S. application Ser. No. 11/834,294 entitled "Proxy Card Representing Many Monetary Sources from a Plurality of Vendors" filed Aug. 6, 2007, now U.S. Pat. No. 8,326,758, all of which are hereby incorporated herein by reference in their entirety and made part of the present U.S. Utility Patent Application for all purposes.

BACKGROUND

1. Technical Field

The present invention relates generally to credit cards; and, more particularly, to sales transactions conducted by point-of-sale devices.

2. Related Art

Credit cards and debit cards are used by a lot of people to conduct sales transactions. A typical person has a plurality of credit cards, ATM accounts, debit cards, checking accounts, SmartCards, charge cards, etc. Such a person would often carry these cards with him/her, typically in a wallet. These cards are likely to be lost, causing a lot of worry and potentially financial trouble, if the person were to lose the purse or wallet. A person is also likely to have savings and checking bank accounts at multiple banks, and managing all those accounts is not easy. Knowing which of those accounts has sufficient balance or credit for a sales transaction takes a lot of lookup, account balancing and tracking. Some people have lines of credit at multiple banks and these have to be managed carefully. Department store credit cards are also used by some people, thereby making it very difficult to manage all of those cards.

Purses and wallets become very fat and heavy due to the plethora of cards a person is likely to carry. A lost or stolen wallet requires a complex process of cancellation of all of one's cards. Often this occurs when traveling and telephone numbers of all card issuers is not available, is difficult to track down, and costly from a PSTN long distance perspective. Also a missing one of such plurality of cards often goes unnoticed.

Lost cards often result from failing to retrieve a card from a vendor, such as a sales clerk at a store. The vendor is not capable of contacting the card holder, and must wait to see if the card holder returns.

Sometimes, when a customer attempts to buy an item at a store using a credit card, the attempted sales transaction is rejected or denied due to insufficient funds, causing embarrassment to the customer. This occurs even when the user has other credit cards with sufficient credit. Such an event when a credit card based transaction fails, for any reason, is not only inconvenient but also a cause of embarrassment. Such embarrassment can also occur due to several reasons, such as a downed network (including problems with the vendor's equipment to the card processor), forgotten payment, or insufficient credit, etc.

Quite often, due to the plethora of bank and other accounts a person possesses, the person finds it very difficult to track the balance and activity of those cards, thereby experiencing delayed payments and unpaid bills. Managing multiple credit cards, debit cards, etc., is therefore a lot of work with the potential of unpaid bills and potential embarrassment during sales transactions at stores.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
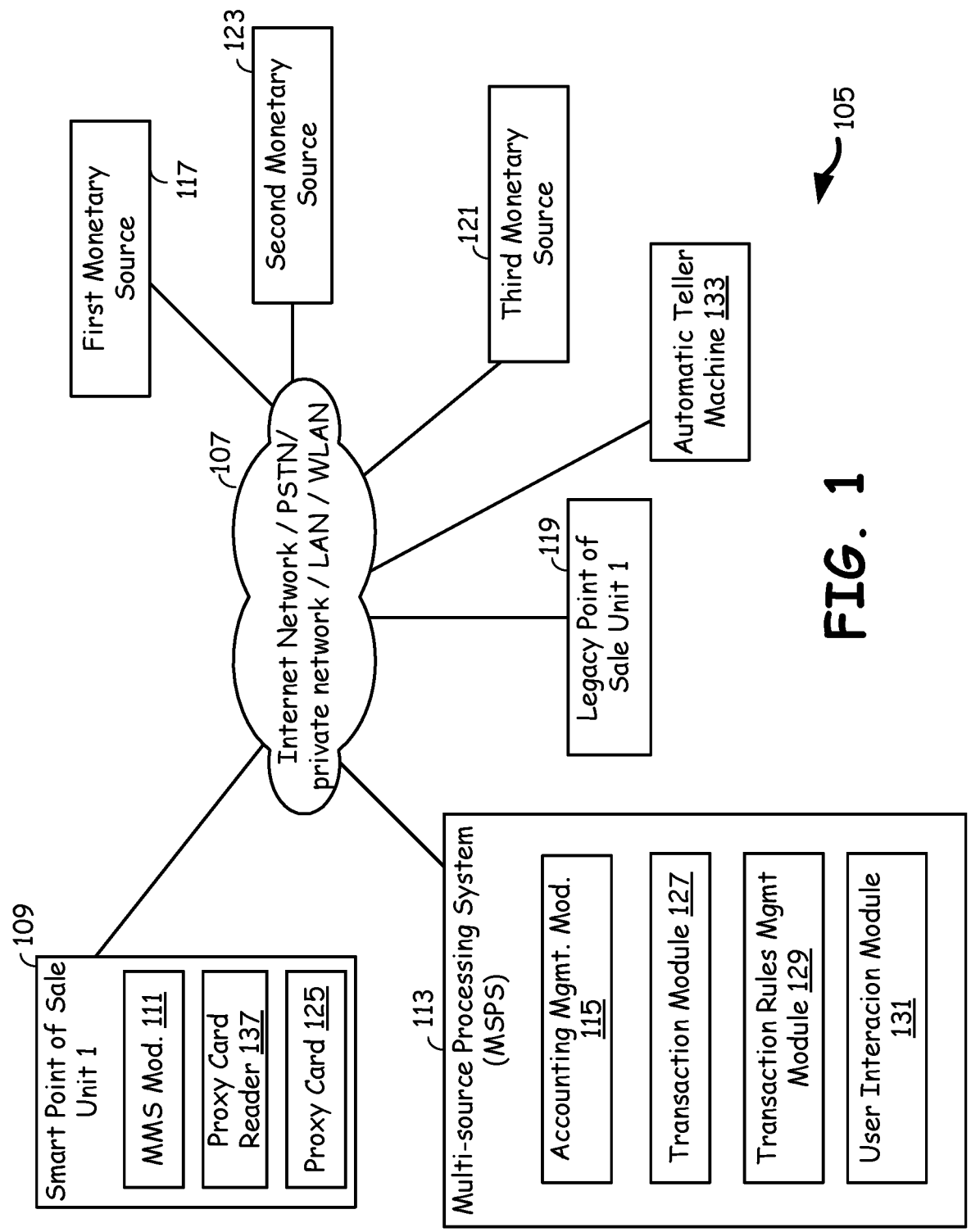
FIG. 1 is a perspective block diagram of a financial transaction network wherein a multi-source processing system (MSPS) facilitates financial transactions conducted from a point of sale unit that uses a proxy card associated with a plurality of monetary sources.

FIG. 1 is a perspective block diagram of a financial transaction network 105 wherein a multi-source processing system (MSPS) 113 facilitates financial transactions conducted from a point of sale unit 109 that uses a proxy card 125 associated with a plurality of monetary sources 117, 121 and 123. The financial transactions conducted are typically sales transactions at a store, purchases of products at a sales counter, withdrawal of money at an ATM, transfer of money, cancelling a transaction conducted previously, etc. The proxy card 125 is associated with one or more of the plurality of monetary sources 117, 121, and 123 with which a user has at least one account. A user can use the proxy card 125 for sales transaction involving the smart point-of-sale unit 109 or a legacy point-of-sale unit 119.

The multi-source processing system 113 includes an account management module 115 that manages interactions with the plurality of user's accounts across multiple monetary sources 117, 121, 123, a transaction module 127, a transaction rules management module 129, and a user interaction module 131. The transaction module 127 manages the user's transactions such as during shopping in stores or charging in restaurants or purchasing items at a departmental store. The transaction rules management module 129 sends information about the rules defined, either by a user or by default, to the transaction module 127. The user interaction module 131 facilitates the definition of the database of rules created or chosen (from a set of pre-created rules), either by the user or specified as default.

The multi-source processing system 113 communicates with the plurality of monetary sources 117, 121 and 123, and the smart point-of-sale unit 109 via a communication network 107. The communication network 107 may be an Internet network, a public switched telephone network (PSTN), cellular network, wireless local area network (WLAN), local area network (LAN) and/or wired or wireless point-to-point link. Other networks such as private networks are also contemplated.

According to the present invention, the smart point-of-sale unit 109 is specifically designed to interact with the plurality of monetary sources 117, 121 and 123, employing the proxy card 125 presented by a customer via a proxy card reader 137, during a typical transaction. The monetary sources 117, 121 and 123 are typically banks or credit card companies that typically provide credit and debit cards to consumers. The plurality of monetary sources 117, 121, 123 are financial servers associated with banks in one embodiment and systems associated with other financial organizations in a different embodiment. A customer can explicitly select, if desired, from one or more of the monetary sources 117, 121 and 123 to conduct a sales transaction. The customer can also conduct a sales transaction involving one or of the monetary sources 117, 121 and 123 that are selected automatically (based on preferences and/or rules), to conduct a sales transaction via the proxy card reader 137 employing the smart point-of-sale unit 109.

The smart point-of-sale unit 109 has a multiple monetary sources (MMS) module 111 that interacts with the monetary sources 117, 121, and 123. Such interactions can be direct or via the MSPS 113. The MSPS 113, in addition, can interact with the legacy point-of-sale unit 119 for backward compatibility of transactions. A legacy automatic teller machine unit 133 can also be used by a user for financial transactions, such as financial deposit or withdrawal using the proxy card 125.

During a typical transaction by a user at the smart point of sale device 109, the user provides his proxy card 125 to a sales clerk or a vendor in order to purchase one or more items for sale. The sales clerk or a vendor slides the proxy card 125 into the proxy card reader 137 or inserts the proxy card 125 into the proxy card reader 137. Other forms of accessing the information of the proxy card 125 may be employed to extract information according to the present invention, e.g., near field communications based connectivity, wireless connectivity, and RF tag based interactions, etc. The MMS module 111 collects the information from the proxy card 125 and the sales transaction related information from the smart point of sale device 109 and conducts a financial transaction across one or more monetary sources 117, 123, 121, as applicable. The smart point of sale device 109 may optionally prompt the user to select one or more of the monetary sources 117, 123, 121 as the target for conducting the associated sales transaction. The smart point of sale device 109 optionally may prompt the user to approve of the sales transaction and the user provides the approval by means of a button provided on the smart point of sale device 109 (or on a keypad associated and communicatively coupled to it). The smart point of sale device 109 then communicates the details of the sales transaction to the MSPS 113. If the user has not specifically targeted one or more of the monetary sources 117, 123, 121 as targets for the sales transactions, the MSPS 113 determines one or more monetary sources 117, 121 and 123 as the targets for the financial transaction (based on rules, for example) and conducts sales sub-transactions with them to complete the user's sales transaction. It then communicates an authorization code to the smart point of sale device 109, which in turn completes the sales transaction and prints out receipts and invoices as necessary.

There are several ways by which the MSPS 113 determines which of the relevant monetary sources 117, 121 and 123 need to be the targets for the financial transaction for a user's sales transaction. For example, if the user has provided transaction rules and they are available for access during a sales transaction, the MSPS 113 uses them to determine the targets for financial transactions. In addition, if a user has not provided any specific transactions rules, then the MSPS 113 accesses default transaction rules for the sales transaction. For example, default transaction rules, saved in the transaction rules management module 129 and accessed by the transaction module 127, can specify that the amount of a sales transaction be distributed evenly across all credit card accounts held by the user across the various monetary sources 117, 121, and 123. Alternately, the default transaction rule, accessed by the transaction module 127, may specify that the amount of a sales transaction be assigned to a single credit card account, determined to be the "lowest-interest credit card account" associated with the user. This lowest-interest credit card account has the lowest interest rate currently assigned to it, across the various credit card accounts held by the user across one or more of the monetary sources 117, 121, and 123 for the particular transaction. If the lowest-interest credit card account does not have sufficient funds currently available, then the remaining (deficit) amount is charged on a second credit card account, wherein the second credit card account would have the next lowest interest rate currently available to the user.

The transaction module 127 executes financial transactions, employing transaction rules retrieved from the transaction rules management module 129. The transaction rules management module 129 facilitates specifying default rules for different types of users (proxy card holder), management of user specified rules for different types of transactions, management of different types of user accounts, such as credit card accounts, debit card accounts, etc. The rules for various types of transactions can be based on interest rates, user's maximum charge levels, available credit, available amount in debit accounts, etc. Such rules can be user specified or default set of rules for various types of users. In one embodiment, the MSPS 113 receives sales transaction information from the POS device or other sales system that also comprises a transaction type indicator from a set comprising "customer signature required", "no customer signature required", "self-check-out", "online purchase" and "bill payment". The rules determined to be relevant based on the transaction type indicator are retrieved transaction rules management module 129 and applied by the transaction module 127.

The MSPS 113 makes it easy to lock and unlock user accounts (credit card accounts debit card accounts, etc.) if they are compromised or if the user suspects identify theft. For example, the MSPS 113 conducts an account lock, an account delete and an account unlock operation, on the user accounts, as needed.

The proxy card 125 is also used with the legacy point of sale unit 119. When the proxy card 125 is swiped or inserted into the legacy point of sale units 119, after sales transaction information is entered into the legacy point of sale unit 119, the sales transaction information is conveyed to the MSPS 113. The MSPS 113 conducts financial transaction with one or more monetary sources 117, 121, and 121, and in response conveys an authorization code to the legacy point of sale units 119, to complete the sales transaction at the legacy point of sale unit 119. The proxy card 125 can also be used in an automatic teller machine (ATM) 133 that is capable of processing the proxy card 125. The ATM 133 facilitates money withdrawal of funds by a user. The ATM 133 facilitates selection of one of a plurality of debit and credit card accounts for conducting a funds withdrawal, funds deposit or funds transfer. It also facilitates withdrawal of funds by the user from more than one of the available accounts associated with the proxy card 125, wherein the withdrawal occurs automatically across one or more accounts based on rules specified by a user, default rules provided, or selections made by user using screens provided by the ATM 133.

The proxy card 125 can be used in sales transactions wherein partial payment is made using at least one credit card account and the rest of the payment is conducted using at least one debit card account. Thus, within a single sales transaction, at least one debit card account, at least one charge card account and at least one credit card account may be used, i.e., the sales transaction is spread over multiple accounts, all facilitated by the same single proxy card 125. Other types of user accounts can also be incorporated into such sales transactions facilitated by the proxy card 125.

If a user leaves a credit card or the proxy card 125 at a retail store with the smart POS device 109, the vendor at the retail store that manages the smart POS unit 109 is able access the MSPS 113 online and contact the user who is the card holder via email, SMS, MMS, via phone, etc. using the information provided by the MSPS 113.

The proxy card 125 provides access accounts held by a user with multiple monetary sources. Employing a set of rules that are applied to complete a transaction with each of the multiple monetary sources with whom a user has an account, the user is able to conduct sales transactions that employ more than one monetary sources to fulfill the monetary requirements (credits, debits or a combination of both, etc.) of the sales transaction.

The proxy card 125 can be used at the ATM 133, at any vendor store that has a legacy point of sale unit 119, or at a store with the smart point of sale 109. In general, it can be used with any Vendor and otherwise as any credit or debit card might be used. The multi-source processing system (MSPS) 113 operates like a transaction processing center on the front end but instead of servicing a single money source, the MSPS 113 selects from one or a plurality of monetary sources 117, 121, 123 that may be associated with a plurality of providers (financial organizations) to apply the corresponding money transfer or credit charges. The money transferred from credit or debit accounts of the user may be either transferred directly or indirectly via a proxy central account associated with the MSPS that a user maintains, with surcharges being applied either way.

In one embodiment, the MSPS 113 maintains and executes a multi-source logic rules (MS logic) when the proxy card 125 based sales transactions (or other types of financial transactions) have to be conducted. The MSPS 113 permits user modification of the multi-source logic rules (MS logic). It delivers a proxy authorization code for a transaction after receiving authorization codes from the selected one or more of the monetary sources 117, 121, 123.

The MSPS 113 keeps track of individual transaction accounts of a user associated with the proxy card. The proxy card is assigned a proxy card identification which is mapped to individual transaction accounts (credit card, debit card, charge card, checking, etc.) by the MSPS 113. The individual transaction accounts may have an account number and/or a card identification. The card identification comprises a card number's prefix, called the Bank Identification Number, which is the sequence of digits at the beginning of the number that determine the bank to which a credit card number belongs. For example, this is the first six digits for MasterCard and Visa cards. It also comprises a card individual account number. For example, the next nine digits can be the individual account number. The card identification also comprise a validity check code, issue and expiration dates (given to the nearest month), as well as extra codes such as issue numbers and security codes. The mapping of the proxy card identification to individual transaction accounts is managed and maintained by the MSPS 113. In one embodiment, the proxy card 125 provides such mapping information to the POS device or an ATM machine it is inserted in (or used with). In a related embodiment, such mapping information is stored in the proxy card itself. In another related embodiment, the proxy card 125 facilitates retrieval of the mapping information from the MSPS 113 for use during a transaction or for modification/management by a user.

Figure 2:
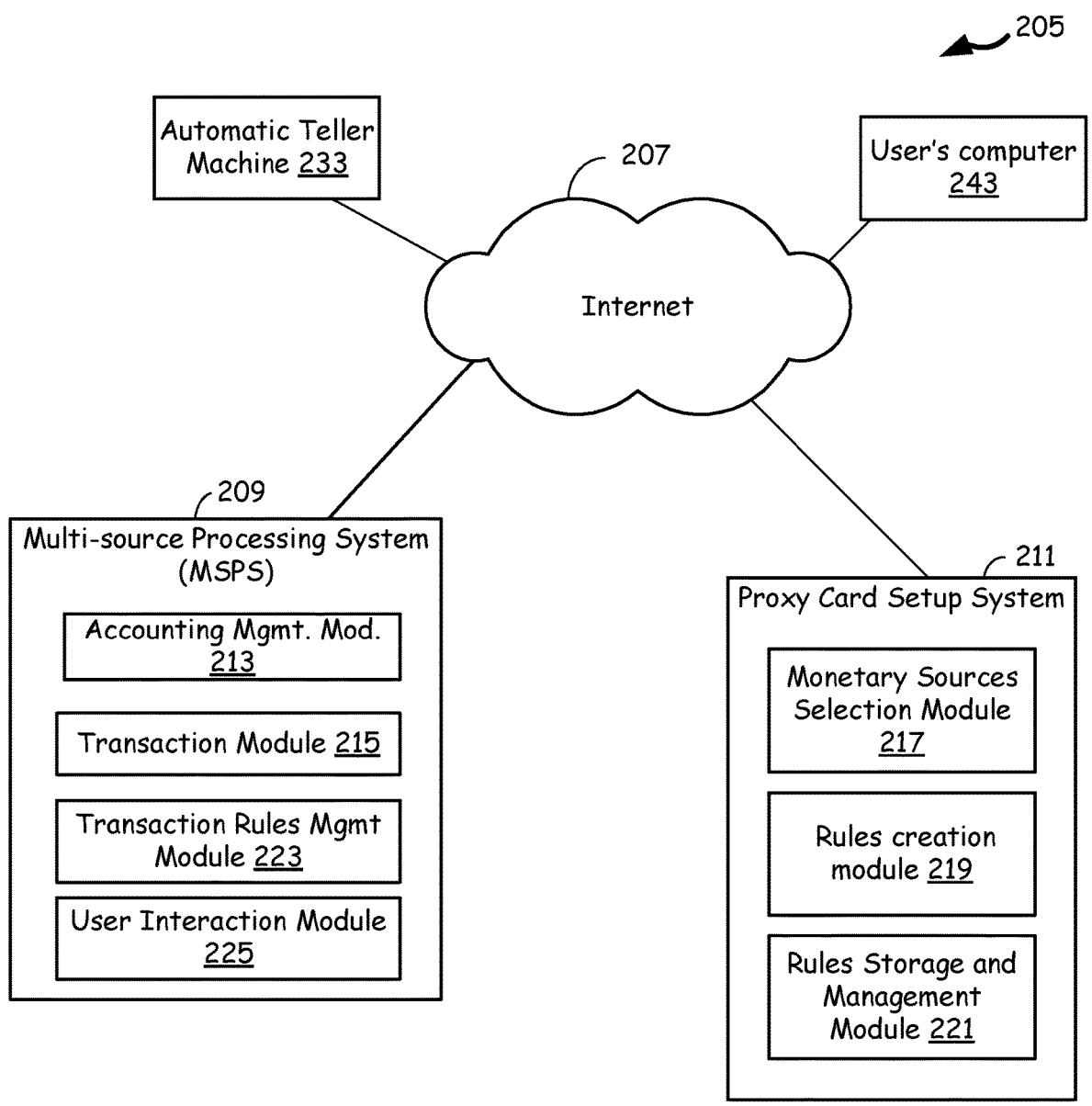
FIG. 2 is a schematic block diagram of a network that supports proxy card based transactions wherein a proxy card setup system makes it possible to create rules that are stored in a multi-source processing system to be retrieved during sales transactions.

FIG. 2 is a schematic block diagram of a network 205 that supports proxy card based transactions wherein a proxy card setup system 211 makes it possible to create rules that are stored in a multi-source processing system 209 to be retrieved during sales transactions. The proxy card setup system 211 consists of multiple monetary sources selection module 217, a rules creation module 219 used to specify preferences and rules, and a rules storage and management module 221. Using the rules creation module 219, the user can define and modify the rules for his financial transactions that are conducted online, using a smart point of sale unit 109 at a store, or using a legacy point of sale unit 119 at a business premises. The rules creation module 219 makes it easy for a user to specify factors influencing the decision rules based on which the selection of one or more monetary sources is made, from a plurality of monetary sources, during a sales transaction. The rules storage and management module 221 facilitates management of rules by a user of a proxy card 125. It makes it easy to retrieve rules, modify them if necessary, delete them or replace them. It makes it possible to store such rules locally or remotely (such as at the MSPS 209).

In one embodiment, a user of a proxy card employs a user's computer 243 to access the proxy card setup system 211 over the Internet 207 to create and or manage the rules for sales transactions involve using the proxy card. In another embodiment, the user of a proxy card employs an automatic teller machine 233 to access the proxy card setup system 211 over the Internet 207 and manage the rules for sales transactions that involve using the proxy card.

In one embodiment, the proxy card contains a mapping between the plurality of transaction accounts (credit card accounts, debit card accounts, etc.) of a user and a proxy card transaction account setup for the user of the proxy card, that is managed by the MSPS 209. The proxy card provides an authorized user's names, an account number and an expiration date for each of the plurality of transaction accounts managed using the proxy card. In a related embodiment, the proxy card also has storage for storing historical records of transactions conducted with that proxy card. It also stores a retrievable picture/image of the user that can be retrieved from the storage and displayed by a point of sale device for identification purposes, for example.

Figure 3:
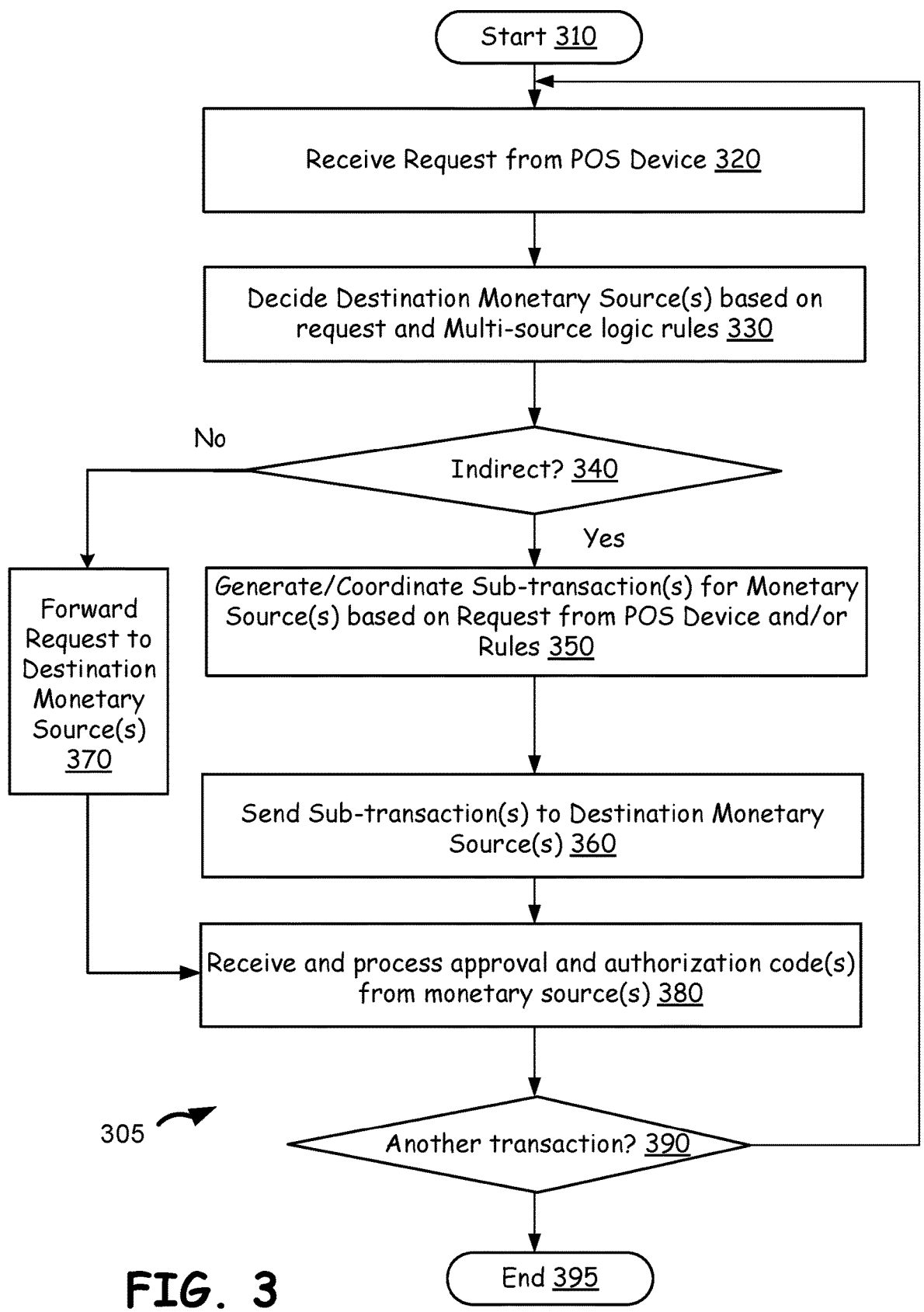
FIG. 3 is a flowchart showing an exemplary operation of a MSPS as it supports financial transactions that are executed in a direct mode and an indirect mode.

FIG. 3 is a flowchart showing an exemplary operation 305 of a MSPS as it supports financial transactions that are executed in a direct mode and an indirect mode. The MSPS facilitates the financial transaction between a point of sale (POS) device that employs a proxy card, and a plurality of monetary sources with whom the user of the proxy card has financial accounts. A user conducts a sales transaction at the POS device using the proxy card. The plurality of monetary sources are typically banks, credit card companies and/or financial institutions that provide credit and debit cards to the user and are involved in such sales transaction. The method 305 of conducting financial transactions starts at block 310. A multi-source processing system (MSPS) receives a transaction request from the POS device at block 320. The transaction request comprises details of a sales transaction being conducted by a user, or details of financial transactions such as money withdrawal or a bill payment being conducted by a user. For sales transactions, the transaction requests include a list of items or services being purchased and the cost of those items or services, the delivery dates, the tax rate, the warranty information, etc., as applicable and available.

At block 330, the MSPS selects one or more of the plurality of monetary sources with which a user has an account, that are capable of participating in the current transaction (sales transaction, financial transaction, bill payments, etc.). The MSPS then, at decision block 340, determines if the transactions needs to be a direct mode transaction or an indirect mode transaction. Based on the transaction request from the POS device and/or a plurality of rules stored in a storage unit of the MSPS, the MSPS determines if a direct mode transaction or an indirect mode transaction needs to be conducted. Direct mode transaction involves conducting individual transactions with each of the targeted monetary sources and sending all received approvals and responses back to the POS device. Thus, the POS device and the user will be able to see details of individual transactions conducted with each of the targeted monetary sources. In this mode, the POS device receives more than one arrival/authorization code—it receives an approval and authorization code from each of the targeted monetary sources from the MSPS, which it records for the sales transaction. In an indirect mode transaction, the MSPS conducts sub transactions with each of the targeted monetary sources while appearing to conduct one single overall transaction. In this mode, the POS device receives one single approval and authorization code from the MSPS, which it records for the sales transaction. The MSPS decides whether the MSPS will support the indirect mode of transaction from the POS device to the selected monetary source(s) in the block 340.

The MSPS forwards the request received from the POS device to the targeted (selected based on user specified rules or default rules for that type of transaction) monetary source(s) in a step 370 if the MSPS decides to support the direct mode of transaction. Then, at block 380, the MSPS receives and processes approval and authorization codes from one or more monetary sources. Processing, in the direct mode, involves, for example, the recording and communication of the received approval and authorization codes from one or more monetary sources to the POS device.

If, at the block 340, the MSPS decides to support the indirect mode of transaction, then the MSPS generates sub-transactions for the selected monetary source(s) in a block 350. The MSPS generates the sub-transactions based on the user-defined rules, for example. Then, at block 360, the MSPS conducts sub-transactions with each of the targeted monetary sources, using appropriate user accounts. At block 380, the MSPS receives and processes approval and authorization codes from one or more monetary sources. Processing, in the indirect mode, involves, for example, the recording of the received approval and authorization codes from one or more monetary sources, generating an overall MSPS approval and an MSPS authorization code that are communicated to the POS device.

At decision block 390, an attempt is made to determine if another transaction needs to be conducted. If it is determined that another transaction needs to be conducted, control passes to the block 320 where another request from the POS device is received. Otherwise, processing terminates at an end block 395.

In one embodiment, the transaction request received at block 320 may comprise a specific credit card charge request, a debit card charge request, a transaction information retrieval request, a transaction-blocking request etc., that identifies a monetary source and that is passed directly to the associated monetary source.

Figure 4:
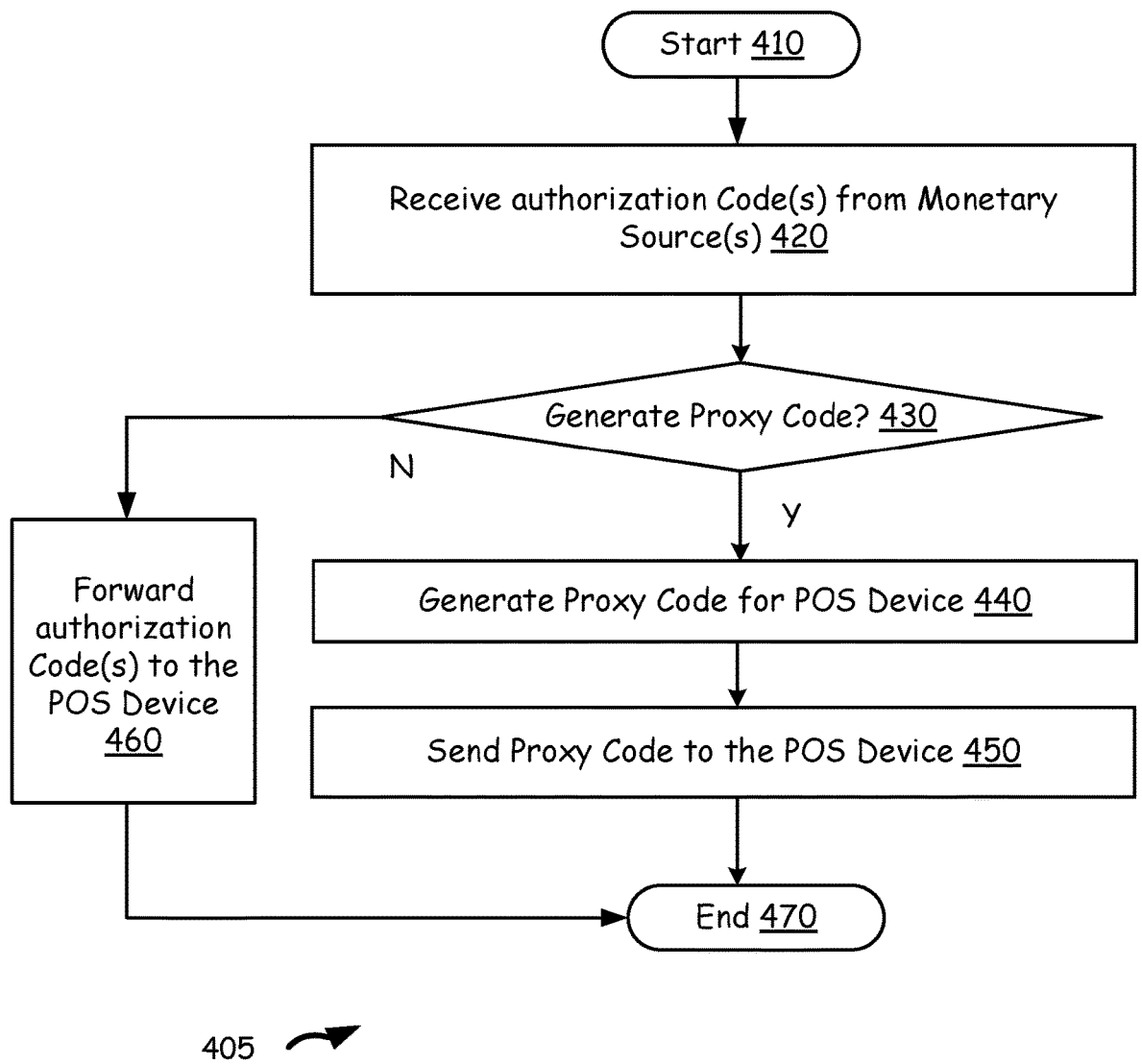
FIG. 4 is a flowchart showing delivery of an authorization code from the monetary sources to the point of sale device in the direct mode and indirect mode described in FIG. 3.

FIG. 4 is a flowchart showing delivery of an authorization code from the monetary sources to the point of sale device in the direct mode and indirect mode described in FIG. 3. The process of delivery starts at a block 410. The MSPS receives at block 420 the approval information and an authorization code from each of a plurality of monetary sources that are targets of a sales transaction. The MSPS is capable of generating an overall MSPS approval and a MSPS authorization code that are communicated to the POS device—such an MSPS authorization code is called a proxy code. Such a proxy code would be used in lieu of individual authorization codes received from one or more monetary sources for a sales transaction conducted from a POS device.

At decision block 430, the MSPS determines if it should generate a proxy code to be sent to the point of sale device or if it should forward the authorization code(s) received directly to the POS device. If the MSPS at the block 430 determines that it needs to generate a proxy code, then a proxy code is generated in block 440 and the mapping of the proxy code generated to the individual authorization codes received from one or more monetary sources is saved in a database or logged. Then, at block 450, the MSPS sends the proxy code to the POS device. Processing then terminated at an END block 470.

If the MSPS in the block 430 determines that it does not need to generate a proxy code (for direct mode transactions, for example), then at block 460, the MSPS forwards the authorization code(s) received from one or more monetary sources to the POS device. Finally, it terminates the processing at the next end block 470.

Figure 5:
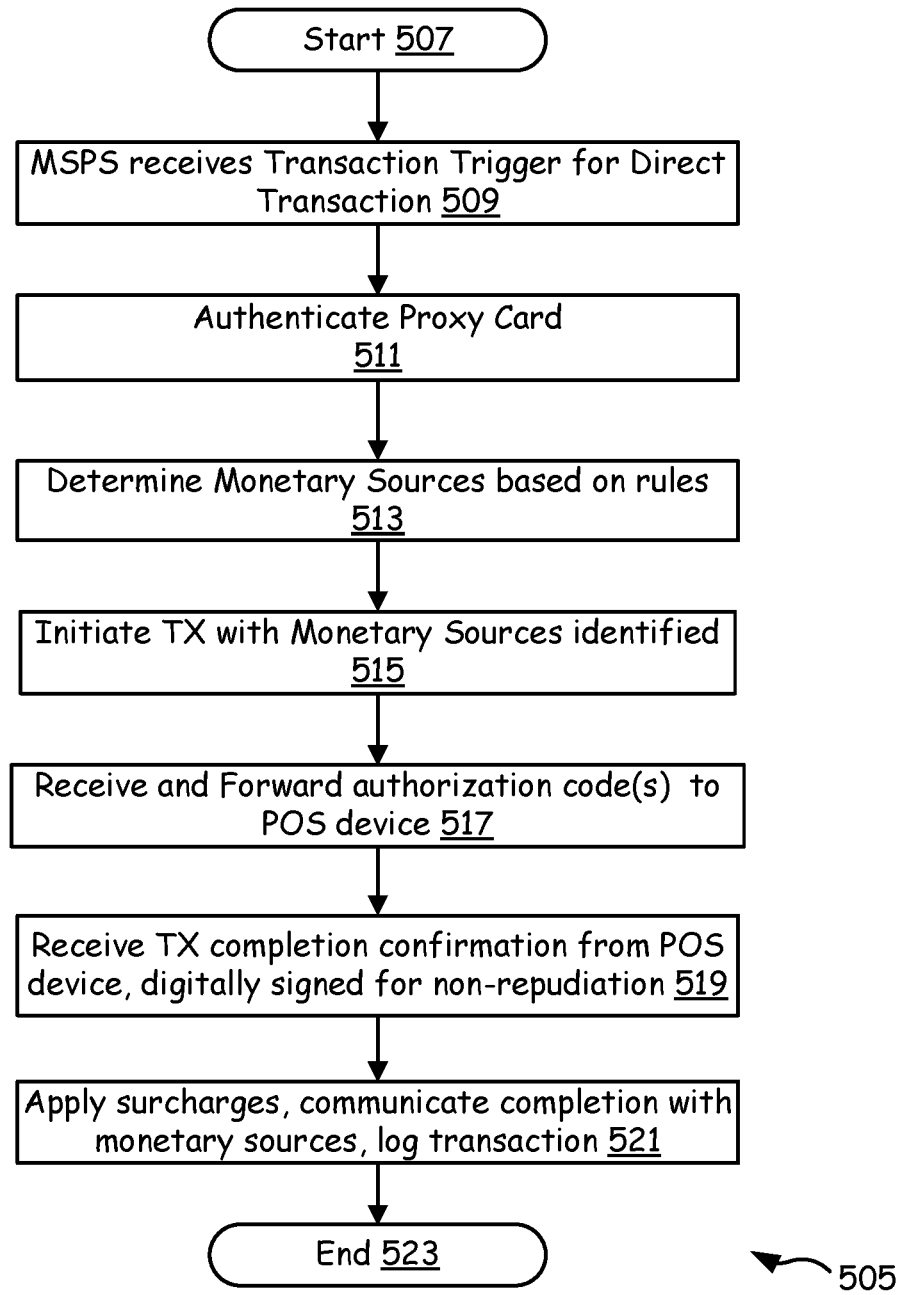
FIG. 5 is a flow chart of an exemplary operation of the MSPS as it handles a direct mode transaction initiated from a POS device that handles a proxy card.

FIG. 5 is a flow chart of an exemplary operation 505 of the MSPS as it handles a direct mode transaction initiated from a POS device that handles a proxy card. The operation of the MSPS for a sales transaction starts at a start block 507. At block 509, the MSPS receives a transaction trigger for direct transaction from the POS device into which the proxy card is inserted or swiped (or communicatively coupled to). At block 511, the MSPS authenticates the user information provided from the proxy card and sales transaction information from the POS device. The authentication involves the verification of user credentials and/or credentials provided by a proxy card.

At block 513, the MSPS determines the monetary sources that have to be involved in the sales transaction. This determination if made based on the rules specified by the user and/or the default rules that apply to that type of sales transaction, the amount of the sales transaction, the category of user, etc. The rules are either defined by the proxy card user or available in the MSPS (Or in some repository) or default rules identified to be relevant, by the MSPS. At block 515, the MSPS then initiates the transaction with the one or more monetary sources identified as targets for the sales transaction. The monetary sources then conduct authentication and authorization checks. Subsequently, they verify the ability to conduct the part of the sales transaction assigned to them—these can be considered as sub-transactions for part of the sales amount. The monetary sources provide approval information (indicating approval or denial, and reasons thereof) as well as corresponding authorization codes to the MSPS that are to be forwarded to the POS device.

Then, at block 517, the MSPS receives and forwards one or more approval information and associated authorization code(s) to the point of sale device. The MSPS then receives transaction completion confirmation for the sales the financial transaction from the POS device in block 519. Such a transaction completion confirmation is digitally signed, optionally, by the POS device, employing keys or other security information provided by the proxy card, for non-repudiation.

Then, at block 521, the MSPS computes charges if any, that are to be applied to the sales transaction and records it. It also communicates transaction completion information to the one or more of the plurality of monetary sources that have participated in the sales transaction. It also logs the transaction related information for billing and tracking purposes. Finally, at an end block 523, the processing terminates.

In one embodiment, at the block 515, during the computation of the total amount for the sales transaction, various surcharges are computed and applied as relevant. Such surcharges can stem from services rendered by the MSPS and/or one or more of the plurality of monetary sources involved in the completion of the sales transaction.

In one embodiment, if one of the targeted monetary source returns a denial message with accompanying failure code, the MSPS, based on rules, determines alternative monetary sources to be contacted for completing the failed portions of the sales transactions.

Figure 6:
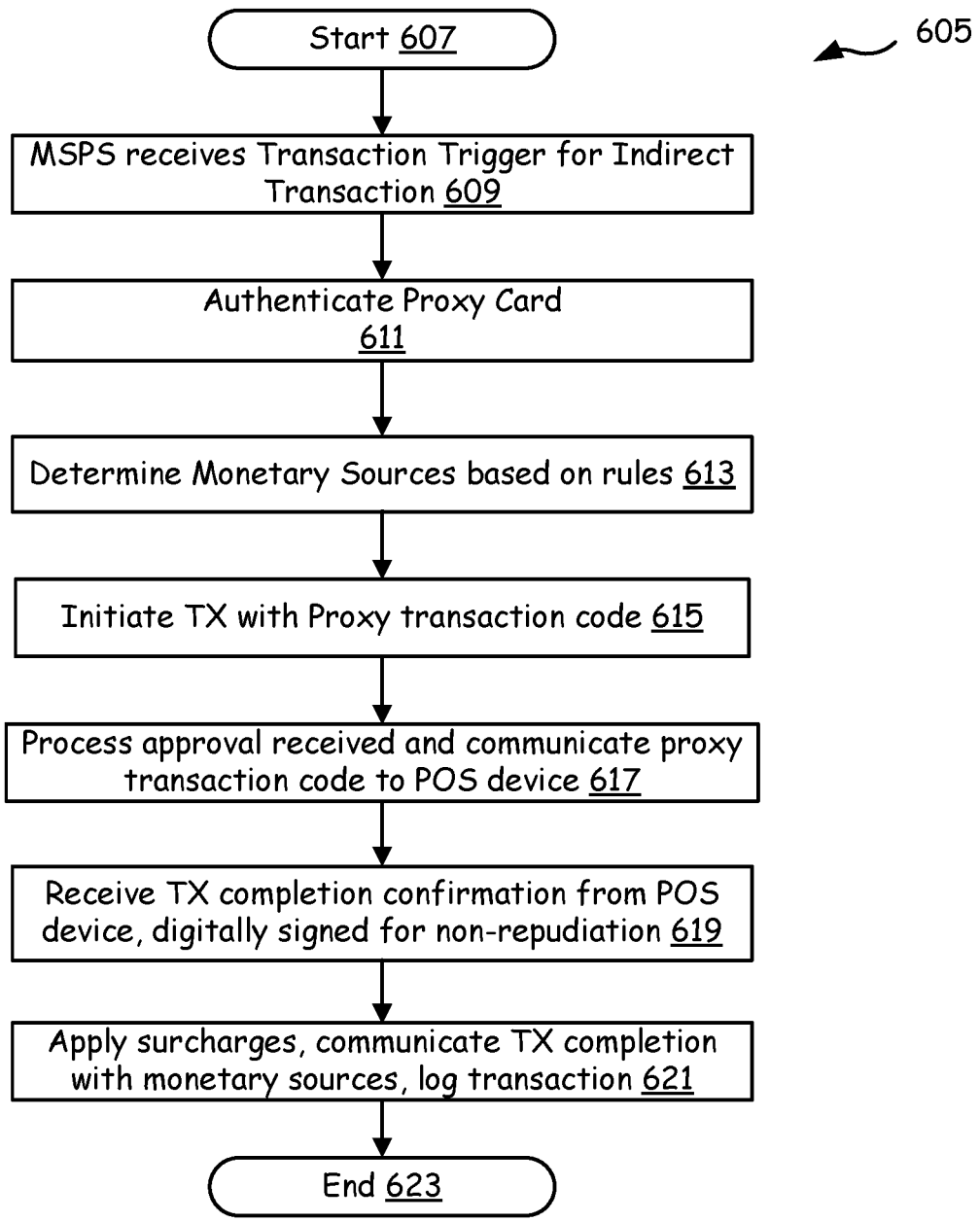
FIG. 6 is a flow chart of an exemplary operation of the MSPS as it handles an indirect mode transaction initiated from a POS device that handles a proxy card.

FIG. 6 is a flow chart of an exemplary operation 605 of the MSPS as it handles an indirect mode transaction initiated from a POS device that handles a proxy card. For example, the indirect transaction using the proxy card is initiated by the POS device when a user attempts to purchase items for sales at a store. The transaction starts at a start block 607 when the MSPS is turned on and is ready to interact with the POS device and with a plurality of monetary sources. Then, at block 609, the MSPS receives a transaction trigger for indirect transaction from the POS device as a proxy card user conducts a sales transaction through the POS device.

At block 611, the MSPS authenticates the proxy card provided by the user for the sales transaction. The authentication involves the verification of user credentials and/or credentials retrieved from the proxy card. At block 613, the MSPS determines the monetary sources to be targeted for the sales transaction, based on the rules determined to be relevant. In one embodiment, the rules are either defined by the proxy card user or provided as default rules and identified as relevant by the MSPS. At block 615, the MSPS then initiates the transaction with one or more monetary sources determined to be targets. It generates a proxy transaction code and communicates that to the targeted monetary sources, along with details if sub-transactions to be conducted. In one embodiment, it receives individual authorization codes from the targeted monetary sources and stores a mapping of the proxy transaction code to the received (one or more) authorization codes.

At block 617, the MSPS sends a proxy transaction code to the point of sale device along with other information such as an approval information and surcharge information. Then, at block 619, the MSPS receives a transaction completion confirmation for the sales transaction from the POS device, such a confirmation typically digitally signed by the POS device using security information (such as keys) from the proxy card, for non-repudiation purposes. At block 621, the MSPS applies surcharges, logs information, and communicates transaction completion information to the targeted monetary sources. Finally, at an end block 623, processing terminates.

Figure 7:
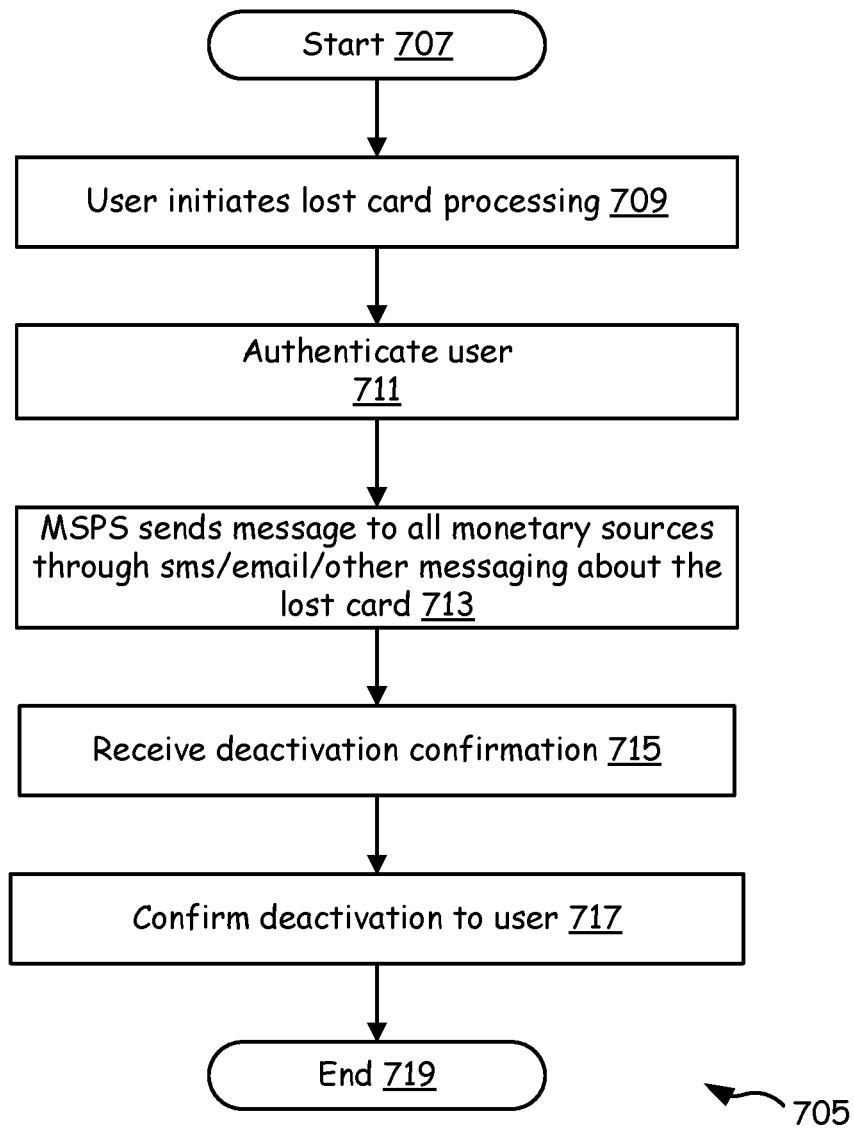
FIG. 7 is a flowchart illustrating an exemplary proxy card deactivation operation conducted by an MSPS when a user reports a lost proxy card.

FIG. 7 is a flowchart illustrating an exemplary proxy card deactivation operation 705 conducted by an MSPS when a user reports a lost proxy card. The user of the proxy card initiates such an operation to ensure that the accounts associated with the proxy card (credit card accounts, debit card accounts, etc.) are not misused or used without authorization from the user. The deactivation process starts in a block 707. At block 709, using a webpage interface, an ATM machine, or other means, the user interacts with the MSPS and provides information about the lost proxy card (such information can be a proxy card number, an account number, a social-security number, an identification number, a user name, etc.). At block 711, the MSPS authenticates the user.

At block 713, after the authentication, the MSPS sends the information regarding the accounts associated with the lost proxy card that are to be temporarily or permanently locked to all relevant monetary sources. The MSPS determines which of the plurality of monetary sources to be targeted for such a message based on a proxy card to monetary source identification mapping that the MSPS maintains (or has access to). The MSPS sends a lost proxy card message to the targeted monetary sources using one of an SMS message, an email, a lost card transaction message, etc.

At block 715, the MSPS receives the confirmation of deactivation or locking of users accounts (credit card account, debit card account, etc.) from a plurality of monetary sources. Then, at block 717, the MSPS informs the user about the deactivation of the proxy card and all associated accounts. Finally, at end block 719, the deactivation operation for the lost proxy card terminates.

Although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The terms "circuit" and "circuitry" as used herein may refer to an independent circuit or to a portion of a multi-functional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A proxy card management system that supports a proxy card and interaction with both a first independent monetary account of a first buyer and a second independent monetary account of the first buyer, the first independent monetary account having a first reference identifier and the second independent monetary account having a second reference identifier, the management system comprising:
   an accounting management module, a transaction module, a transaction rules management module, and a user interaction module together:
   storing a proxy card number, the proxy card number being associated with the first buyer, the first reference identifier and the second reference identifier, the first reference identifier and the second reference identifier being associated with the proxy card number via assistance of the first buyer;
   supporting a plurality of purchase transactions serviced by the proxy card according to a configuration that allocates a corresponding plurality of purchase amounts between the first independent monetary account and the second independent monetary account; and
   supporting disassociation by the first buyer of the proxy card number and the first reference identifier to detach the first independent monetary account without having to engage in closure of the first independent monetary account.

2. The proxy card management system of claim 1 wherein the corresponding plurality of purchase amounts is apportioned at a predefined ratio between the first independent monetary account and the second independent monetary account.

3. The proxy card management system of claim 1 wherein further interaction with the first user alters the predefined ratio between the first independent monetary account and the second independent monetary account.

4. The proxy card management system of claim 1 wherein further interaction with the first user alters usage rules of the first independent monetary account and the second independent monetary account for purchase transactions.

5. The proxy card management system of claim 1 further comprising:
   the proxy card management system servicing a payment transfer interaction for each of the plurality of purchase transactions via a point of sale device such that a merchant account receives payment from the first independent monetary account and the second independent monetary account.

6. The proxy card management system of claim 1 further comprising:
   the proxy card management system supporting determination of trends in user spending and enabling a user to change payment and spending habits.

* * * * *